United States Patent
Sigling

(10) Patent No.: US 6,613,297 B1
(45) Date of Patent: Sep. 2, 2003

(54) CATALYST BODY

(75) Inventor: Ralf Sigling, Alpharetta, GA (US)

(73) Assignee: Siemens Aktiengesellschaft, Munich (DE)

( * ) Notice: Subject to any disclaimer, the term of this patent is extended or adjusted under 35 U.S.C. 154(b) by 437 days.

(21) Appl. No.: 09/665,764

(22) Filed: Sep. 20, 2000

Related U.S. Application Data

(63) Continuation of application No. PCT/DE99/00600, filed on Mar. 5, 1999.

(30) Foreign Application Priority Data

Mar. 20, 1998 (DE) .......................... 198 12 321

(51) Int. Cl.⁷ .................... B01D 53/86; B01D 53/56
(52) U.S. Cl. ...................... 422/180; 422/171; 422/177; 422/222
(58) Field of Search ............... 422/171, 177, 422/179, 180, 222

(56) References Cited

U.S. PATENT DOCUMENTS

| | | | |
|---|---|---|---|
| 3,189,418 A | * 6/1965 | Gary | 422/176 |
| 3,853,485 A | 12/1974 | Hogan | 422/180 |
| 4,305,910 A | 12/1981 | Kudo et al. | 422/179 |
| 4,521,532 A | 6/1985 | Cho | 502/439 |
| 5,140,813 A | * 8/1992 | Whittenberger | 422/180 |
| 5,693,294 A | * 12/1997 | Anderson et al. | 422/180 |
| 5,857,140 A | * 1/1999 | Foster | 422/179 |

FOREIGN PATENT DOCUMENTS

| | | |
|---|---|---|
| DE | 35 01 941 A1 | 7/1986 |
| EP | 0 241 269 A2 | 10/1987 |
| EP | 0 262 558 A1 | 4/1988 |
| EP | 0 820 810 A1 | 1/1998 |

OTHER PUBLICATIONS

Published International Application No. WO 97/27385 (Dullien), dated Jul. 31, 1997.
Japanese Patent Abstract No. 02021947 (Shuya), dated Jan. 24, 1990.

* cited by examiner

Primary Examiner—Hien Tran
(74) Attorney, Agent, or Firm—Laurence A. Greenberg; Werner H. Stemer; Ralph E. Locher

(57) ABSTRACT

With a catalyst that is operated in a dust-containing off-gas, there is a problem with the catalyst becoming blocked by individual particles contained in a gas flowing onto the catalyst. The invention describes a catalyst body with a multiplicity of first longitudinal passages, which also contains second longitudinal passages. The second longitudinal passages have a larger passage cross-section than the first longitudinal passages. As a result, the advantage of a high specific surface area per volume of the catalyst is maintained in combination with simultaneous permeability to individual particles.

11 Claims, 6 Drawing Sheets

CATALYST BODY

CROSS-REFERENCE TO RELATED APPLICATION

This is a continuation of copending International Application PCT/DE99/00600, filed Mar. 5, 1999, which designated the United States.

BACKGROUND OF THE INVENTION

Field of the Invention

The invention relates to a catalyst body with an inlet side, an outlet side and a multiplicity of longitudinal passages through which a medium can flow from the inlet side to the outlet side.

A catalyst body is used for cleaning off-gas (exhaust gas) from a combustion plant, for example for removing nitrogen oxides using the selective catalytic reaction (SCR) process, hydrocarbons, carbon monoxide and/or dioxins from the off-gas. A combustion plant is, for example, a boiler plant, a coal-fired, oil-fired or gas-fired fossil power plant, a gas turbine or an internal combustion engine, in particular a diesel engine. A refuse incineration plant also emits pollutants. The reactants that are to be reacted with one another flow through longitudinal passages from the inlet side to the outlet side of the catalyst body, through the latter. The catalyzed reaction proceeds when the reactants come into contact with the wall surface. In this context, a catalyst body is understood as meaning a compact catalytic element or a module composed of a plurality of catalytic elements.

The so-called AP value represents a measure of the catalytic activity of a catalyst body. This value is defined as the ratio of a geometric surface area of the catalyst body to its volume ($m^2/m^3$). To achieve the maximum possible AP value for the catalyst body—and therefore the smallest possible volume of the catalyst body—it is attempted to shape the catalyst body in such a way that it has the largest possible surface area. One possibility of achieving this is to make the cross sections of the individual longitudinal passages small in combination with walls between the longitudinal passages which are configured to be as thin as possible.

However, the size of the cross section of the longitudinal passages must depend on an installation location of the catalyst body. The use of a catalyst body with longitudinal passages of small cross section for lowering the nitrogen oxide or dioxin levels in an off-gas from a combustion plant causes problems if the off-gas at the same time has a very high dust content. In a plant of this nature, a so-called high-dust plant, it is preferable to use catalyst bodies with longitudinal passages of large cross section, since these are less susceptible to blockages. However, given the same catalytic activity of the overall catalyst body, the volume of a catalyst body with longitudinal passages of large cross section is greater than that of a catalyst body with longitudinal passages of small cross section. If a catalyst body with longitudinal passages of small cross section is used in a high-dust plant, for example because there is not sufficient space in the off-gas duct of the plant for a large catalyst body, the operating risk is correspondingly high. In some cases, catalyst bodies in plants of this nature become blocked.

SUMMARY OF THE INVENTION

It is accordingly an object of the invention to provide a catalyst body which overcomes the above-mentioned disadvantages of the prior art devices and methods of this general type, which combines the advantage of a high AP value with longitudinal passages of small cross section with a low risk of blockages even in dust-containing off-gases.

With the foregoing and other objects in view there is provided, in accordance with the invention, a catalytic converter. The catalytic converter contains a catalyst body, including: an inlet side having at least one recess formed therein; an outlet side; and a multiplicity of first longitudinal passages formed in the catalyst body and extending from the inlet side to the outlet side. Each of the first longitudinal passages has a passage cross-section through which a medium can flow from the inlet side toward the outlet side. A plurality of second longitudinal passages are formed in the catalyst body and extend from the inlet side to the outlet side. Each of the second longitudinal passages are disposed substantially in a region of the recess and has a passage cross section being larger than the passage cross section of the first longitudinal passages. Additionally, the number of the second longitudinal passages is less than the number of the first longitudinal passages.

The object is achieved by a catalyst body that contains a multiplicity of first longitudinal passages and, according to the invention, additionally a smaller number of second longitudinal passages. A passage cross section of the second longitudinal passages is larger than a passage cross section of the first longitudinal passages.

The invention is based on the consideration that longitudinal passages become blocked in particular if large individual particles—such as so-called popcorn ash, which forms, for example, through the coal burner of a coal-fired power plant functioning incorrectly, or melt beads which are entrained by the off-gas and are formed during so-called slag tap firing—occur, which are unable to fit through the first longitudinal passages. Starting from these blocked longitudinal passages, the increased depositing of ash results in that further blockage of adjacent regions can easily occur. Therefore, a relatively small number of large individual particles leads to a large part of the catalyst body becoming blocked. The fact that only a few second longitudinal passages of large cross section are provided results in that first the advantage of the high AP value is scarcely detracted from, and second a free passage is created even for oversized individual particles, so that blockage is reliably avoided. The number of second longitudinal passages, as well as their size and configuration in the honeycomb structure, can be adapted to the specific operating conditions.

In an advantageous configuration of the invention, the openings to the second longitudinal passages are distributed over the inlet side of the catalyst body and are each spaced apart by regions with regularly disposed first longitudinal passages. Large individual particles from the off-gas which do not fit through the first longitudinal passages are moved to and fro by the gas flow over the openings to the first longitudinal passages, which are disposed regularly over the inlet side of the catalyst body, and, in the above configuration of the invention, find an opening to a second longitudinal passage in the vicinity, through which they fit and can leave the inlet side in this way.

In catalyst bodies of standard construction, the passage cross section of the first longitudinal passages is between 4 $mm^2$ and 70 $mm^2$. This enables a favorable AP value of up to more than 900 $m^2/m^3$ to be achieved. The passage cross section of the second longitudinal passages is expediently selected in such a way that individual particles of standard size which are entrained in the gas flow can pass through the second longitudinal passages. Definitive determination of the cross section may, but does not necessarily have to, be preceded by a dust analysis carried out on the off-gas. The dust analysis gives information on the grain size distribution in the off-gas and on the presence of individual particles of excess size (popcorn ash, slag tap beads). The passage cross section of the second longitudinal passages is expediently between 9 mm² and 200 mm². If a cross section that is not a multiple larger than that of the first longitudinal passages is selected, the AP value of the catalyst body is reduced only slightly.

Likewise in order to ensure that the AP value of the catalyst body is reduced only slightly, the number of second longitudinal passages is selected to be as low as possible. Depending on the dust and particle content of the off-gas, the number of second longitudinal passages is expediently between 10 and 500 per m² of inflow area. The inflow area is intended to mean the inlet side of the catalyst body lying perpendicular to the inlet direction of an off-gas.

In a further advantageous configuration of the invention, the inlet side of the catalyst body has at least one recess and the second longitudinal passages are each disposed substantially in the area of the recess. In this configuration of the invention, the large individual particles are blown by the in flowing gas into the recess of the inlet side, where they can be received by the second longitudinal passages of larger passage cross section and pass freely through the catalyst body. The recess may, for example, be configured as a local depression or a groove within the inlet side or as a lowered section of a planar surface piece on the inlet side toward one side.

A configuration of the inlet side of the catalyst body that is advantageous in terms of manufacturing technology is achieved by configuring the inlet side as one or more substantially planar surfaces. With a catalyst body of this type, a recess is formed in the inlet side of the catalyst body by disposing the planes such that they are not perpendicular to the inlet direction of the gas, but rather are inclined with respect to this direction. Individual particles are therefore diverted along these inclined surfaces, under the influence of the gas flow, in each case to the larger (second) longitudinal passages.

For manufacturing technology reasons, large catalyst bodies are advantageously composed of a number of catalytic elements. If the inlet sides of all or many of the catalytic elements of a catalyst body are planes which are inclined with respect to the inlet direction, it is appropriate for the catalytic elements to be assembled to form the catalyst body in such a way that the recesses of the inlet sides of the catalytic elements face toward one another. A particularly effective configuration of the inlet side of the catalyst body consists in the inlet side of approximately rectangular catalytic elements being configured in such a way that the deepest point thereof comes to lie at a corner of the inlet side. If four such corners of adjacent catalytic elements face toward one another, they produce a funnel-shaped recess into which large individual particles contained in an inflowing gas are blown by the gas flow. With this configuration of the inlet side of the catalyst body, a single second longitudinal passage per catalytic element is sufficient to prevent the inlet side from becoming blocked by large particles.

In a further advantageous embodiment of the invention, in a catalyst body with a number of catalytic elements, the second longitudinal passages are situated outside the catalytic elements. They are formed from longitudinal grooves running in the direction of flow on the outer wall of the catalytic elements or from free spaces that are formed in the catalyst body by chamfered longitudinal edges of the individual catalytic elements. Alternatively, they are machined for example into a sealing compound that connects the catalytic elements or into another material which lies between the catalytic elements, such as for example a metal frame.

This configuration obviates the need for the second longitudinal passages to be machined into the individual catalytic elements.

The catalyst body may advantageously be configured as a supported catalyst, in which a support body is coated with a catalytically active layer. Alternatively, the catalyst body may advantageously also be formed as an unsupported extrudate. In this case, the catalyst body consists solely of catalytic material. An unsupported extrudate may be produced with the aid of an extruder that produces shaped bodies from a soft, plastic compound which is then consolidated (e.g. by calcining).

To lower the levels of nitrogen oxides, that surface of each passage which is freely accessible to the gas advantageously contains the materials titanium dioxide ($TiO_2$) in a proportion of from 70 to 95% by weight, tungsten trioxide ($WO_3$) and/or molybdenum trioxide ($MoO_3$) in a proportion of from 5 to 20% by weight, and vanadium pentoxide ($V_2O_5$) in a proportion of less than 5% by weight. A catalyst body of this nature is also known as a deNOx catalyst body.

It is particularly advantageous to use a catalyst body with first and second longitudinal passages in combination with a soot blower which is disposed upstream of the catalyst body, as seen in the direction of flow of the off-gas, in the off-gas duct of the combustion plant. The soot blower blows compressed air, hot steam or a similar high-pressure medium out of a multiplicity of nozzles onto or over the entire inlet side of the catalyst body at set intervals. As a result, dust deposits which have formed on the inlet side from dust entrained by the off-gas are blown through the longitudinal passages. Large individual particles which have been entrained by the off-gas flow and do not fit through the first longitudinal passages are moved to and fro on the inlet side of the catalyst body by the turbulent compressed-air or steam flow from the soot blower—even more than by the off-gas flow itself—, find second longitudinal passages and are able to pass through the catalyst body through these second passages and thus leave its inlet side.

Other features which are considered as characteristic for the invention are set forth in the appended claims.

Although the invention is illustrated and described herein as embodied in a catalyst body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
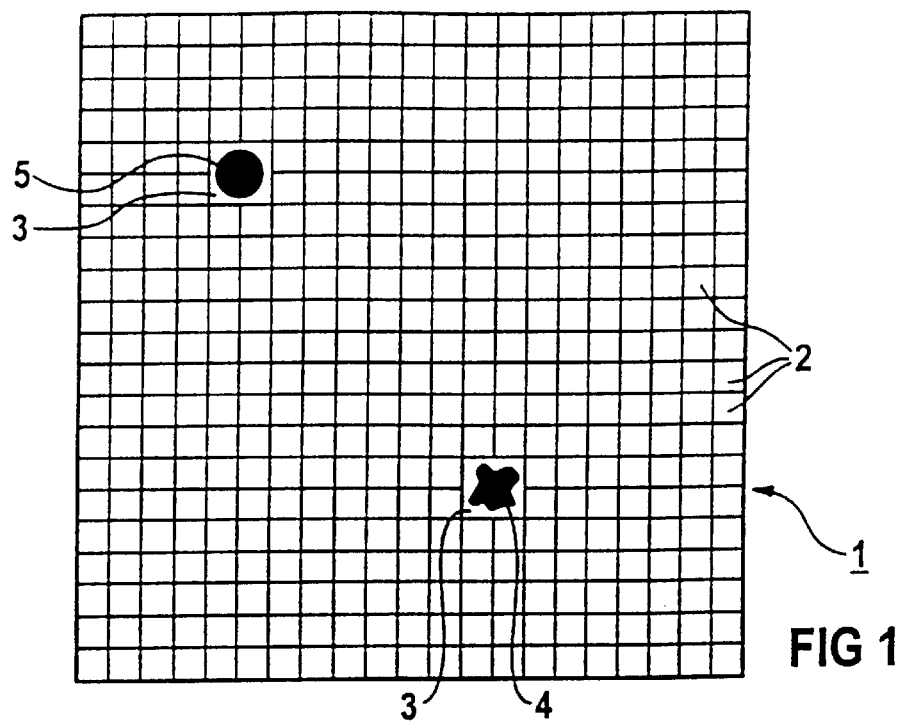
FIG. 1 is a diagrammatic, front-elevational view of an inlet side of a catalyst body with two second longitudinal passages which allow large individual particles to pass through according to the invention.

In all the figures of the drawing, sub-features and integral parts that correspond to one another bear the same reference symbol in each case. Referring now to the figures of the drawing in detail and first, particularly, to FIG. 1 thereof, there is shown a catalyst body 1, which in addition to first longitudinal passages having small cross sections 2 also contains second longitudinal passages of larger cross section 3. It is possible for large individual particles 4, 5, in FIG. 1 a slag tap bead 5, which is formed in combustion plants with hot slag tap firing, and so-called popcorn ash 4, which occurs in the event of a coal burner malfunctioning, to pass through the catalyst body 1 through the second longitudinal passages. The number of second longitudinal passages is 88 per $m^2$ of inflow area. The individual particles are moved on the inlet side by the inflowing gas until they have found an opening of the second longitudinal passage.

Figure 2:
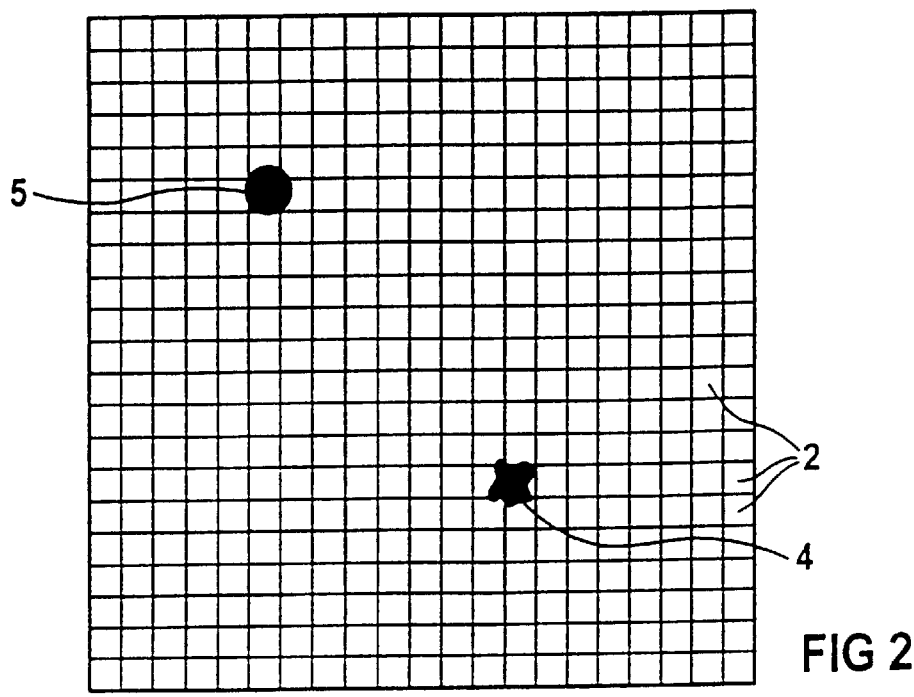
FIG. 2 is a front-elevational veiw of the inlet side of a conventional catalyst body with large individual particles lying thereon.

A conventional catalyst body is shown in FIG. 2, which only has the first longitudinal passages 2, becomes blocked if the gas flowing in at the inlet side of the catalyst body 1 contains the large individual particles 4, 5. The individual particles 4, 5 remain on the inlet side and cannot pass through the catalyst body 1.

Figure 3:
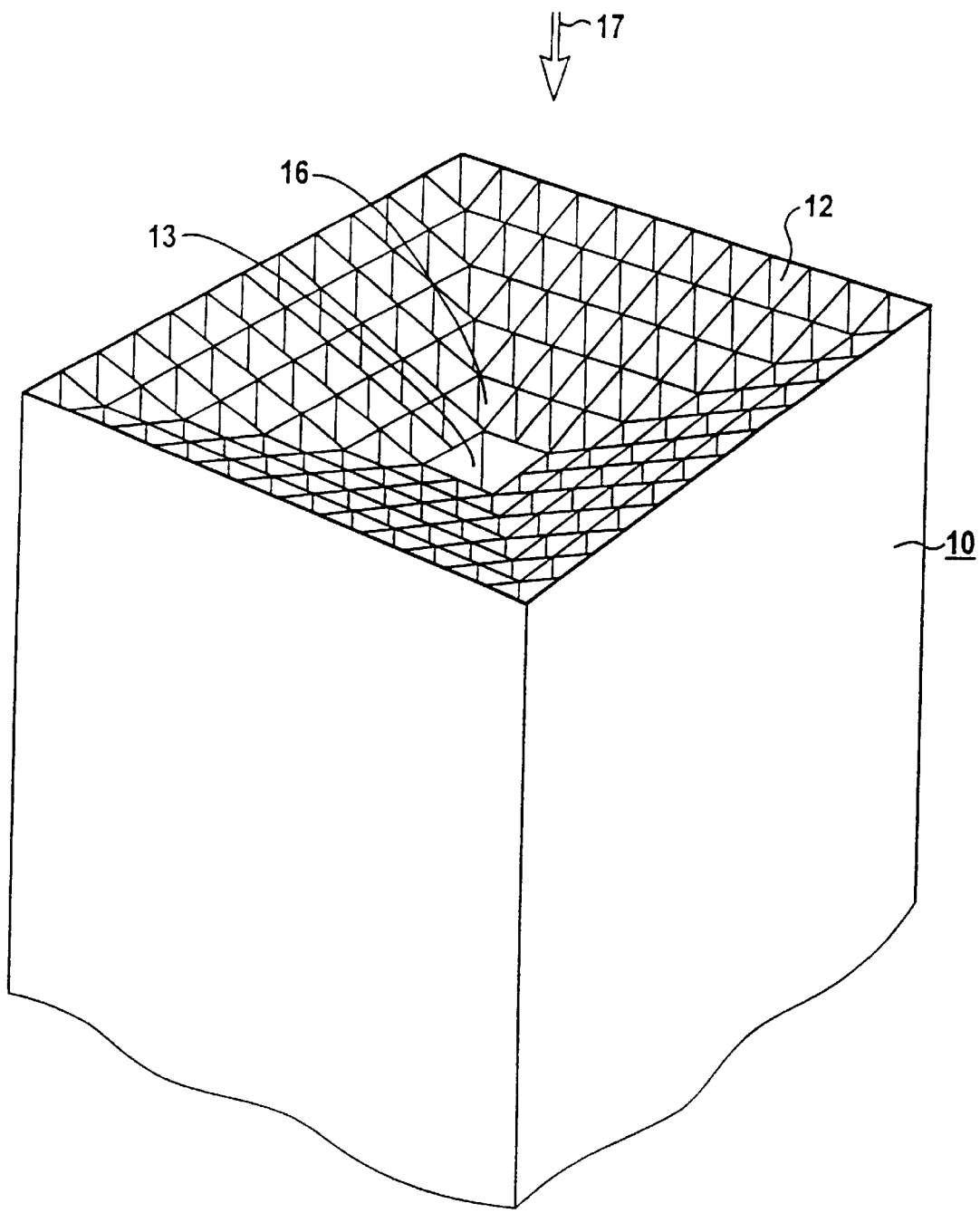
FIG. 3 is a perspective view of the inlet side of the catalyst body which has a recess, a second longitudinal passage is situated at a deepest point of the inlet side.

FIG. 3 shows a perspective view of a catalyst body 10, an inlet side of which has a recess 16. Large particles which are entrained by a gas flowing onto the inlet side of the catalyst body 10 in an inlet direction 17 and do not fit through first longitudinal passages 12 of the catalyst body 10 are blown into the recess 16 by the inflowing gas, where they find a passage through the catalyst body 10 via a second longitudinal passage 13. The first longitudinal passages 12 have a passage cross section of 36 $mm^2$, and the second longitudinal passage 13 has a passage cross section of 144 $mm^2$.

Figure 4:
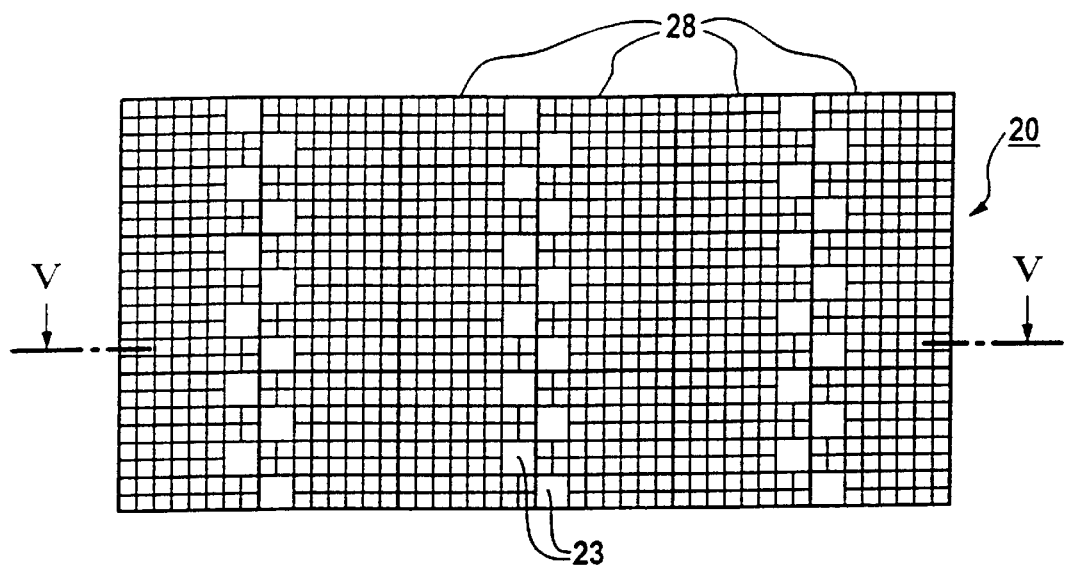
FIG. 4 is a plan view of the inlet side of the catalyst body composed of catalytic elements and in which the recesses fitted with the second longitudinal passages are disposed in the form of longitudinal valleys.
Figure 5:
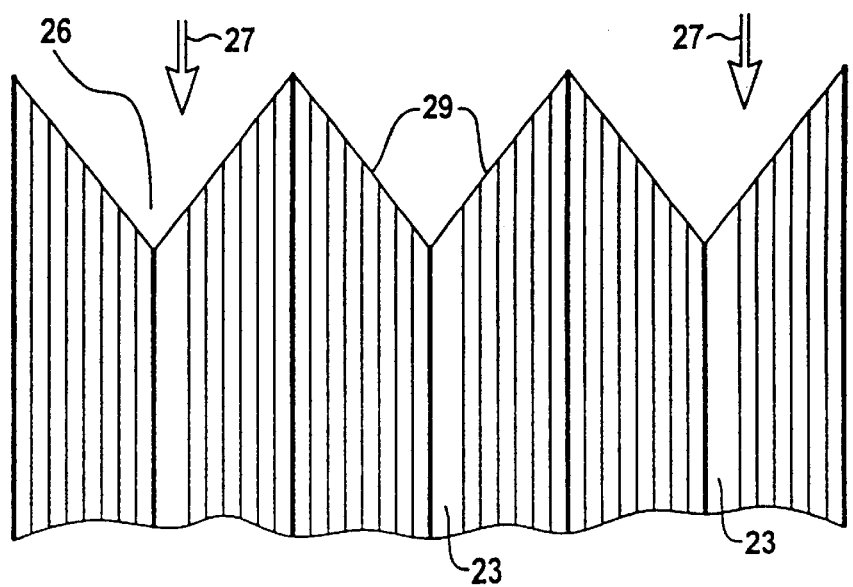
FIG. 5 is a sectional view through the catalyst body taken along line V—V shown in FIG. 4.

In the exemplary embodiment shown in FIGS. 4 and 5, a catalyst body 20 is assembled from catalytic elements 28 that are of identical configuration. FIG. 5, which represents a section through the catalyst body 20 shown in FIG. 4, taken along line V—V, shows that the inlet sides of the catalytic elements 28 are planes 29 which are inclined with respect to an inlet direction 27 of the gas flowing in. The inclination of the inlet sides of the individual catalytic elements 28 results in the formation of recesses 26 in the form of rectilinear valleys in the inlet side of the catalyst body 20, at the deepest points of which second longitudinal passages 23 are formed.

Figure 6:
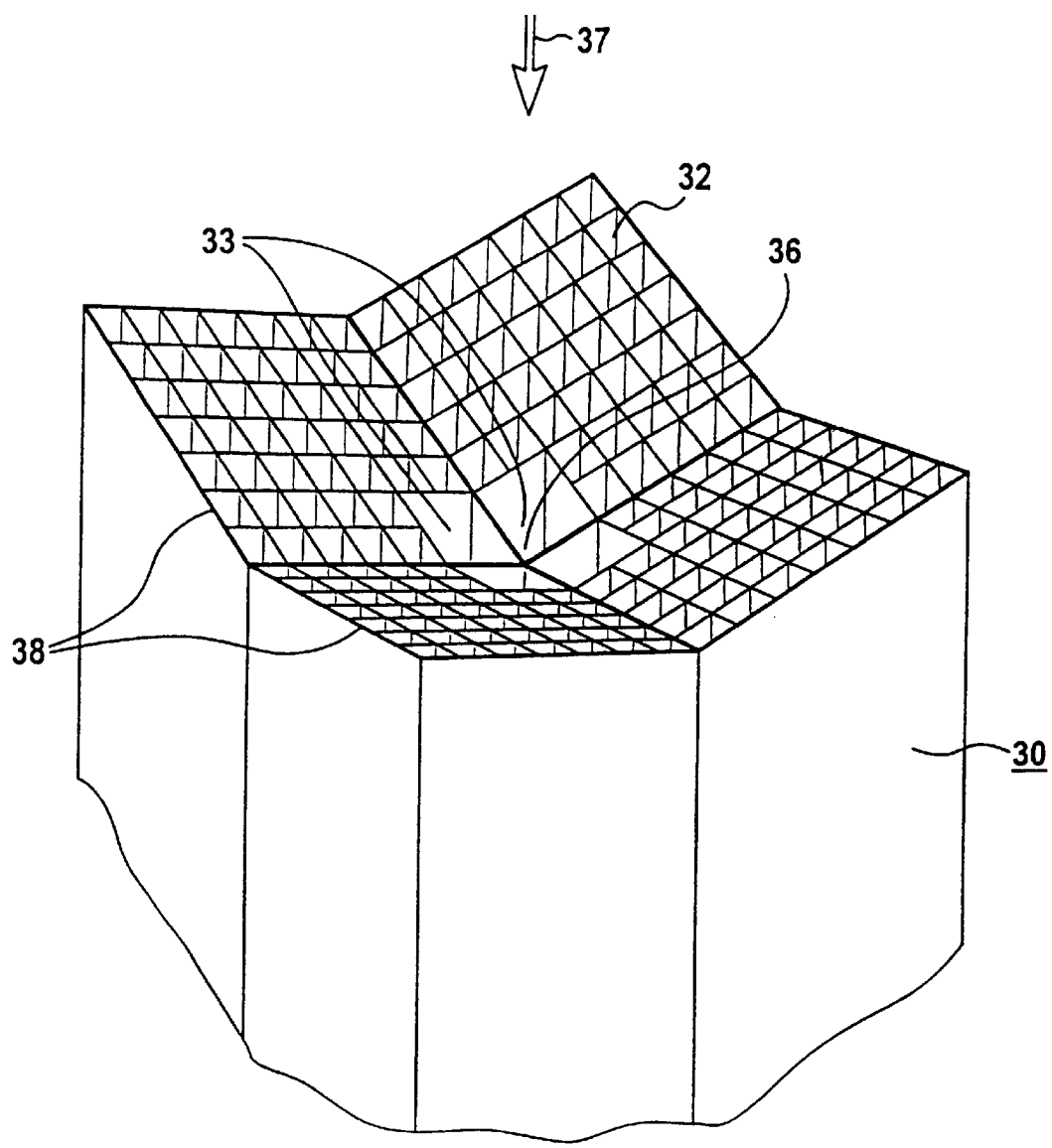
FIG. 6 is a perspective view of the inlet side of the catalyst body that is assembled from four catalytic elements.

In the exemplary embodiment shown in FIG. 6, four catalytic elements 38 are assembled to form a catalyst body 30 with first longitudinal passages 32. Inlet sides of the catalytic elements 38 are configured as planes that are inclined with respect to an inlet direction 37 of the gas flowing in. The inlet sides of the four catalytic elements 38 are inclined in such a way that they form a basin-shaped valley as a recess 36, at the deepest point of which second longitudinal passages 33 are formed. The catalyst body 30 is configured as a supported catalyst that is coated with a catalytically active compound.

Figure 7:
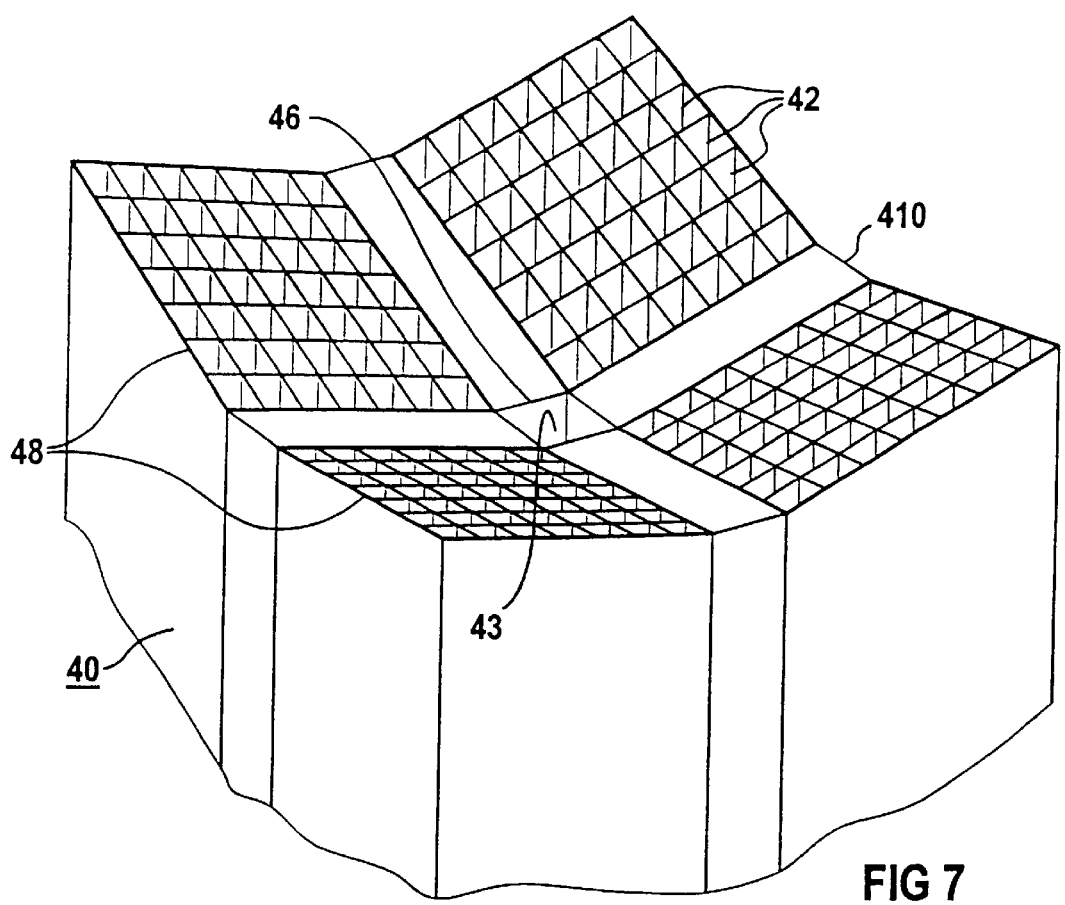
FIG. 7 is a perspective view of the inlet side of the catalyst body which is assembled from four catalytic elements which are spaced apart from one another by a sealing compound.

In the exemplary embodiment shown in FIG. 7, a catalyst body 40 is assembled from four catalytic elements 48 that are spaced apart from one another by a sealing compound 410. The catalytic elements 48 are formed from an unsupported extrudate made of a catalytically active compound. A second longitudinal passage 43 is formed in the compound 410 at the deepest point 46 of the inlet side of the catalyst body 40. Only first longitudinal passages 42 are machined into the catalytic elements 48.

Figure 8:
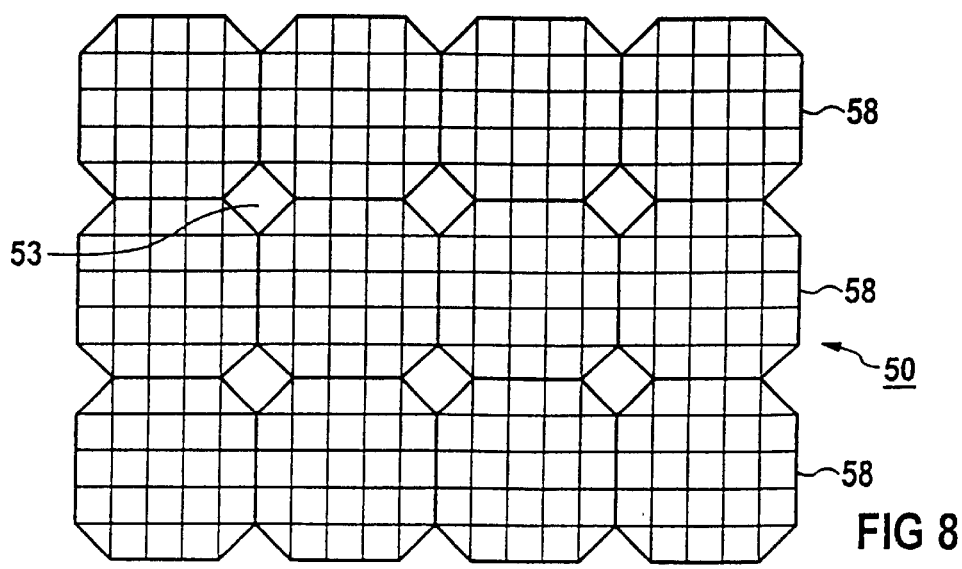
FIG. 8 is a plan view of the inlet side of the catalyst body that is assembled from twelve catalytic elements and in which the second longitudinal passages are situated outside the individual catalytic elements.

FIG. 8 shows a plan view of an inlet side of a further exemplary embodiment of a catalyst body 50 which is assembled from catalytic elements 58 and in which second longitudinal passages 53 are formed outside the catalytic elements 58 by the shape of the catalytic elements 58. The catalytic elements 58 are formed from a catalytically active compound which contains the materials titanium dioxide ($TiO_2$) in a proportion of from 70 to 95% by weight, tungsten trioxide ($WO_3$) and/or molybdenum trioxide ($MoO_3$) in a proportion of from 5 to 20% by weight, and vanadium pentoxide ($V_2O_5$) in a proportion of less than 5% by weight.

Figure 9:
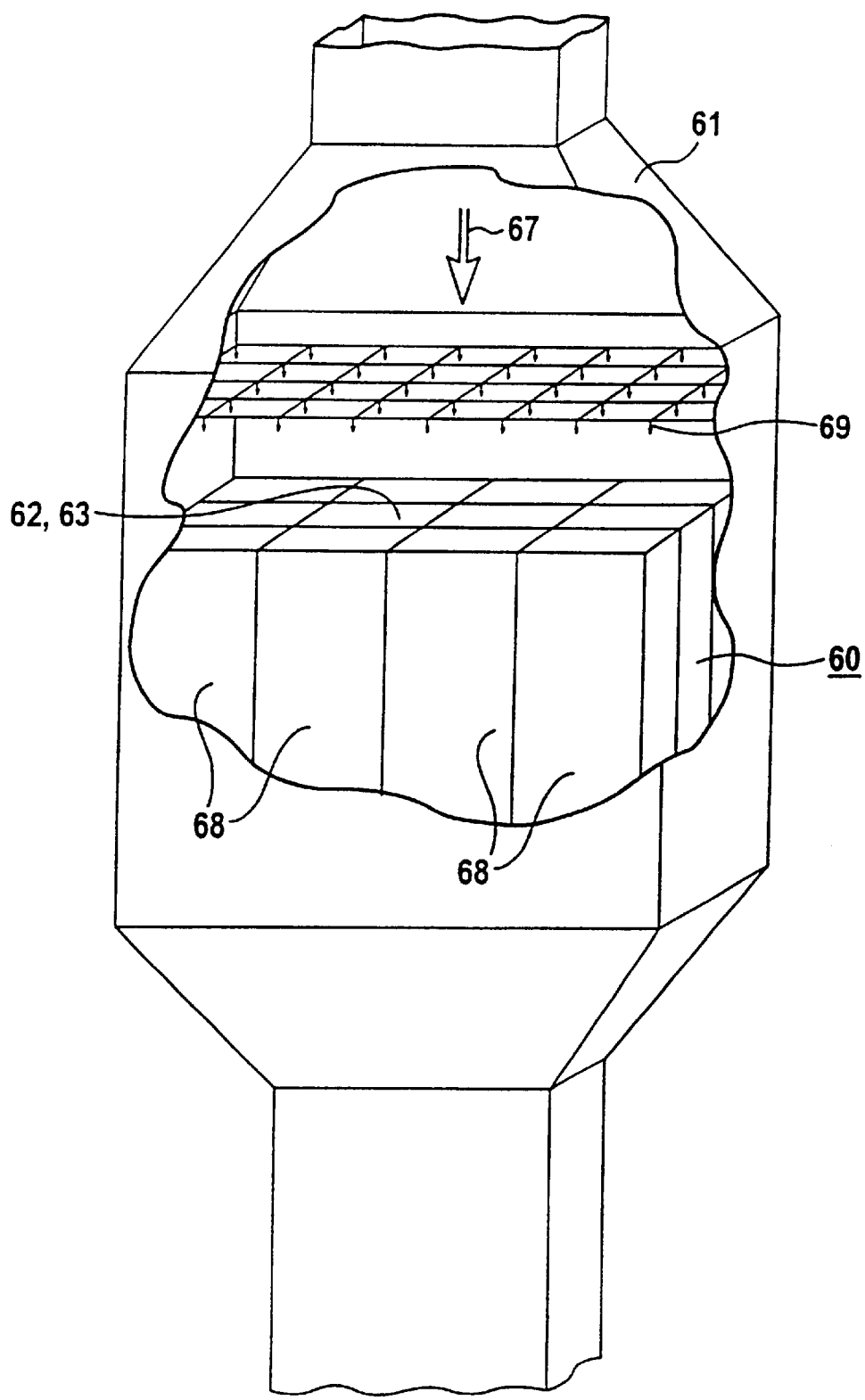
FIG. 9 is a partially, cut-way, perspective view of the catalyst body in an off-gas duct of a combustion plant with an upstream soot blower.

FIG. 9 shows a perspective view of a catalyst body 60 with catalytic elements 68, which contains first longitudinal passages 62 and second longitudinal passages 63, in an off-gas duct 61 of a combustion plant of a fossil-fired power plant. Above the catalyst body 60, i.e. upstream of the catalyst body 60 as seen in the direction of flow 67 of the off-gas, there is a soot blower 69 which at defined intervals blows compressed air or hot steam onto the entire inlet side of the catalyst body 60. Large individual particles that have been entrained by the off-gas flow and have been left on the inlet side are moved to and fro in the turbulence created by the compressed air or steam on the inlet side. In this way, they find the second longitudinal passages 63, through which they can leave the inlet side.

I claim:

1. A catalytic converter, comprising:
   a catalyst body, including:
   an inlet side having at least one recess formed therein;
   an outlet side;
   a multiplicity of first longitudinal passages formed in said catalyst body and extending from said inlet side to said outlet side, each of said first longitudinal passages having a passage cross section through which a medium can flow from said inlet side toward said outlet side; and
   a plurality of second longitudinal passages formed in said catalyst body and extending from said inlet side to said outlet side, each of said second longitudinal passages disposed substantially in a region of said recess and having a passage cross section being larger than said passage cross section of said first longitudinal passages, a number of said second longitudinal passages being less than a number of said first longitudinal passages.

2. The catalytic converter according to claim 1, wherein said second longitudinal passages are spaced apart from each other with said first longitudinal passages disposed therebetween.

3. The catalytic converter according to claim 1, wherein said passage cross section of said first longitudinal passages is between 4 mm² and 70 mm², and said passage cross section of said second longitudinal passages is between 9 mm² and 200 mm².

4. The catalytic converter according to claim 1, wherein said number of said second longitudinal passages is between 10 and 500 per m² of an inflow area.

5. The catalytic converter according to claim 4, wherein said inlet side is configured as at least one substantially planar surface inclined toward said recess.

6. The catalytic converter according to claim 1, wherein said catalytic body is formed of a number of catalytic elements.

7. The catalytic converter according to claim 6, wherein said second longitudinal passages are disposed substantially outside of said catalytic elements.

8. The catalytic converter according to claim 1, wherein said catalyst body is a supported catalyst coated with a catalytically active compound.

9. The catalytic converter according to claim 1, wherein said catalyst body is an unsupported extrudate made from a catalytically active compound.

10. The catalytic converter according to claim 8, wherein said catalytically active compound is formed of titanium oxide ($TiO_2$) in a proportion of from 70 to 95% by weight, at least one of tungsten trioxide ($WO_3$) and molybdenum trioxide ($MoO_3$) in a proportion of from 5 to 20% by weight, and vanadium pentoxide ($V_2O_5$) in a proportion of less than 5% by weight.

11. The catalytic converter according to claim 9, wherein said catalytically active compound is formed of titanium oxide ($TiO_2$) in a proportion of from 70 to 95% by weight, at least one of tungsten trioxide ($WO_3$) and molybdenum trioxide ($MoO_3$) in a proportion of from 5 to 20% by weight, and vanadium pentoxide ($V_2O_5$) in a proportion of less than 5% by weight.

* * * * *